US009327437B2

(12) United States Patent
Zaffino

(10) Patent No.: US 9,327,437 B2
(45) Date of Patent: *May 3, 2016

(54) MOULD WITH CONFORMAL COOLING

(71) Applicant: Ariel Andre Waitzman, Franklin, MI (US)

(72) Inventor: Pascal Zaffino, Windsor (CA)

(73) Assignee: Ariel Andre Waitzman, Franklin, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/736,387

(22) Filed: Jun. 11, 2015

(65) Prior Publication Data

US 2015/0273749 A1 Oct. 1, 2015

Related U.S. Application Data

(63) Continuation of application No. 13/958,002, filed on Aug. 2, 2013, which is a continuation of application No. 12/870,017, filed on Aug. 27, 2010, now Pat. No. 8,517,248.

(60) Provisional application No. 61/251,498, filed on Oct. 14, 2009.

(51) Int. Cl.
| | | |
|---|---|---|
| *B23K 31/02* | (2006.01) |
| *B22D 27/04* | (2006.01) |
| *B29C 45/73* | (2006.01) |
| *B23K 9/04* | (2006.01) |
| *B23K 33/00* | (2006.01) |
| *B23K 10/02* | (2006.01) |
| *B23K 26/34* | (2014.01) |
| *B22D 17/22* | (2006.01) |
| *B22C 9/00* | (2006.01) |
| *B29C 33/04* | (2006.01) |
| *B29K 101/00* | (2006.01) |
| *B29L 31/30* | (2006.01) |

(52) U.S. Cl.
CPC ............... *B29C 45/7312* (2013.01); *B22C 9/00* (2013.01); *B22D 17/2218* (2013.01); *B23K 9/04* (2013.01); *B23K 10/027* (2013.01); *B23K 26/342* (2015.10); *B23K 26/345* (2013.01); *B23K 33/004* (2013.01); *B29C 33/04* (2013.01); *B29K 2101/00* (2013.01); *B29K 2905/00* (2013.01); *B29L 2031/3044* (2013.01); *Y10T 29/49* (2015.01)

(58) Field of Classification Search
CPC .. B23K 26/345; B23K 33/004; B23K 10/027; B23K 9/04
See application file for complete search history.

(56) References Cited

U.S. PATENT DOCUMENTS 8,517,248 B2 * 8/2013 Zaffino ...................... 228/141.1

* cited by examiner

*Primary Examiner* — Erin Saad
(74) *Attorney, Agent, or Firm* — Carlson, Gaskey & Olds, P.C.

(57) ABSTRACT

A method of providing a mould with a conformal cooling passage includes rough machining a mould cavity generally corresponding to a moulded part shape using CAD data. Conformal cooling slots are cut in the mould cavity using the CAD data. The conformal cooling slots are welded shut using the CAD data to provide conformal cooling passages. A class A surface is machined over the conformal cooling passage and corresponds to a finished mould part shape using the CAD data.

15 Claims, 3 Drawing Sheets

MOULD WITH CONFORMAL COOLING

RELATED APPLICATIONS

This application is a continuation of prior U.S. Patent Application No. 13/958,002, filed on Aug. 2, 2013. The '002 Application is a continuation of prior U.S. patent application Ser. No. 12/870,017, filed on Aug. 27, 2010, which claims the benefit of U.S. Provisional Application No. 61/251,498, filed on Oct. 14, 2009.

BACKGROUND

This disclosure relates to moulds having conformal cooling and a method for providing the same.

Moulds, such as those used in plastic injection moulding, are subject to significant heat during the injection moulding process. The moulds are cooled during injection moulding to cool the plastic part and improve cycle times.

Over the years conformal cooling has been used to improve mould cooling by providing more uniform cooling of the part. A conformal cooling approach provides cooling passages that generally conform to or follow the contour of the moulded part beneath the finished mould surface. Since the finished mould surface is of a generally complex shape, it is difficult to provide conformal cooling passages in the desired location. Typically, intersecting passages are gun-drilled into the mould, and then plugged at various locations, to provide the conformal cooling passages. Providing conformal cooling passages in this manner is undesirable due to the large expense, the difficulty in gun-drilling large moulds (such as those used for vehicle bumpers), and the poor approximation of the conformal cooling passages to the finished mould surface.

SUMMARY

A mould with conformal mould cooling passage includes a mould with a cut conformal cooling slot having a surface. Weld beads laid on the surface enclose the cut conformal cooling slot with a metal filler adjoining the cut conformal cooling slot to provide an enclosed conformal cooling passage. A class A machined surface is provided across the weld beads and the mould adjoining the cut conformal cooling slot.

A method of providing a mould with a conformal cooling passage includes rough machining a mould cavity generally corresponding to a moulded part shape using CAD data. Conformal cooling slots are cut in the mould cavity using the CAD data. The conformal cooling slots are welded shut using the CAD data to provide conformal cooling passages. A class A surface is machined over the conformal cooling passage and corresponds to a finished mould part shape using the CAD data.

DETAILED DESCRIPTION

Figure 1A:
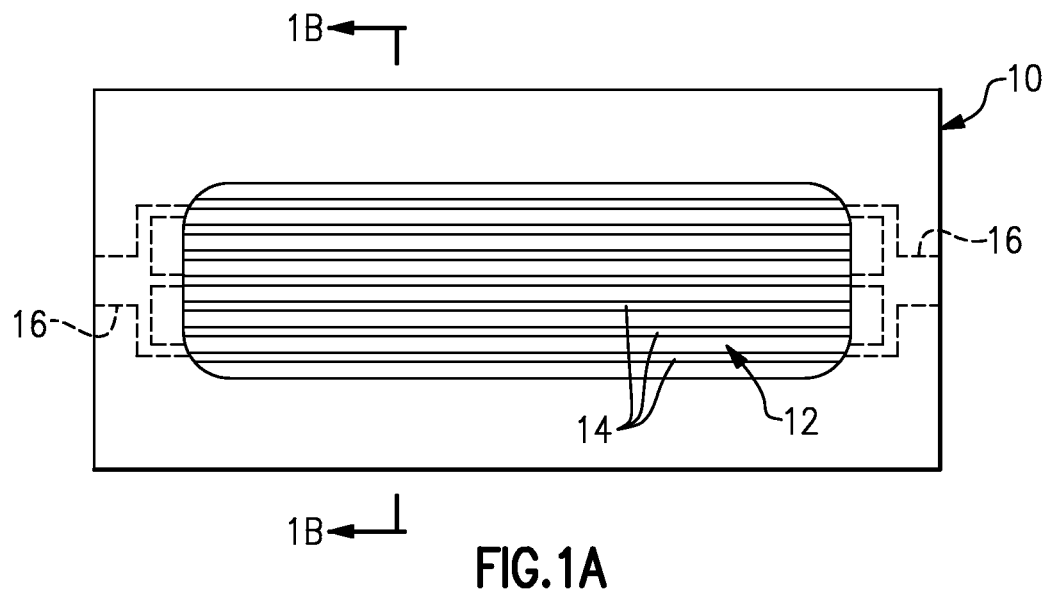
FIG. 1A is a top elevational view of mould with rough mould cavity and cut conformal cooling slots.
Figure 1B:
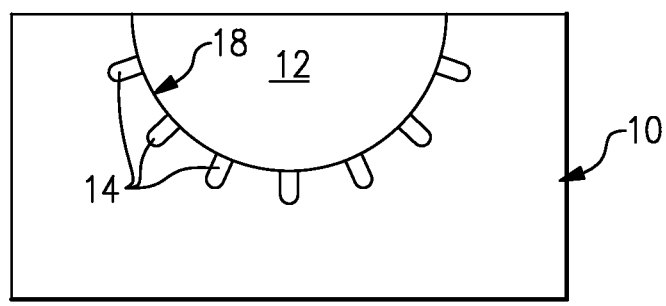
FIG. 1B is a cross-sectional view of the mould in FIG. 1A taken along line 1A-1A.

A mould 10 is shown in FIGS. 1A and 1B that is suitable, for example, for injection moulding. The mould 10 was provided as a blank and machined to provide a rough mould cavity 12 having a rough contoured surface 18 generally corresponding to a shape of a part to be moulded, for example, a vehicle bumper. Cut conformal cooling slots 14 are machined into the rough contoured surface 18 at a first depth 25 of 1.5-2.5 inches, for example. Other fluid passages 16 may be machined to intersect the cut conformal cooling slots 14 to communicate fluid from a cooling fluid source.

Figure 2:
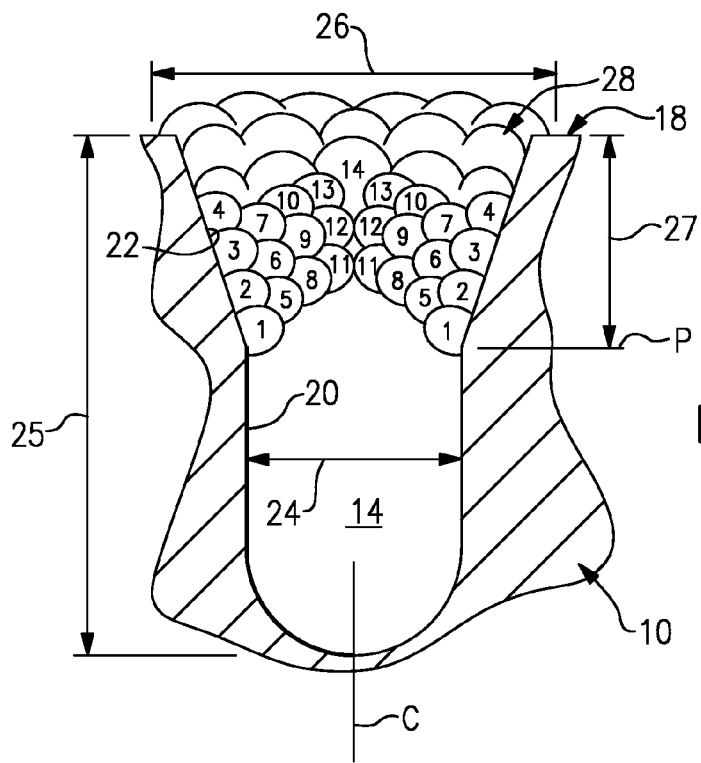
FIG. 2 is a cross-sectional view of a cut conformal cooling slot with weld beads.

An example cut conformal cooling slots 14 is shown in more detail in FIG. 2. The cut conformal cooling slot 14 provides spaced apart lateral walls 20, providing a first width 24, that are generally parallel with one another in the example shown. Spaced apart angled walls 22 adjoin the lateral walls 20 and taper generally away from one another to provide a second width 26 where the angled walls 22 meet the rough contoured surface 18. In one example, the first width 24 is approximately 0.5 inch, and the second width 26 is approximately 0.75 inch at the rough contoured surface 18. The lateral and angled walls 20, 22 may be provided by a single cutting tool.

The angled walls 22 are provided at an angle of approximately 10-20° relative to the lateral wall to provide a surface for welding. The cut conformal cooling slot 14 includes a centerline C, and the angled walls 22 are provided at an angle relative to the centerline C. During welding, the angled walls 22 are arranged at an obtuse angle relative to a true horizontal plane P to reduce the undesired effects of gravity on the weld bead as it transitions from the molten state to solid metal. Weld beads 28 are laid on the angle walls 22 starting at a second depth 27 of approximately 0.5-0.75 inch below the rough contoured surface 18. The weld beads 28 are built up on top of one another, for example, in the number sequence indicated in FIG. 2, until the weld beads are proud of the rough contoured surface. The weld beads 28 are robotically TIG welded onto the mould 10 according to U.S. application Ser. No. 11/924,649, filed Oct. 27, 2007, which is incorporated by reference.

Figure 3:
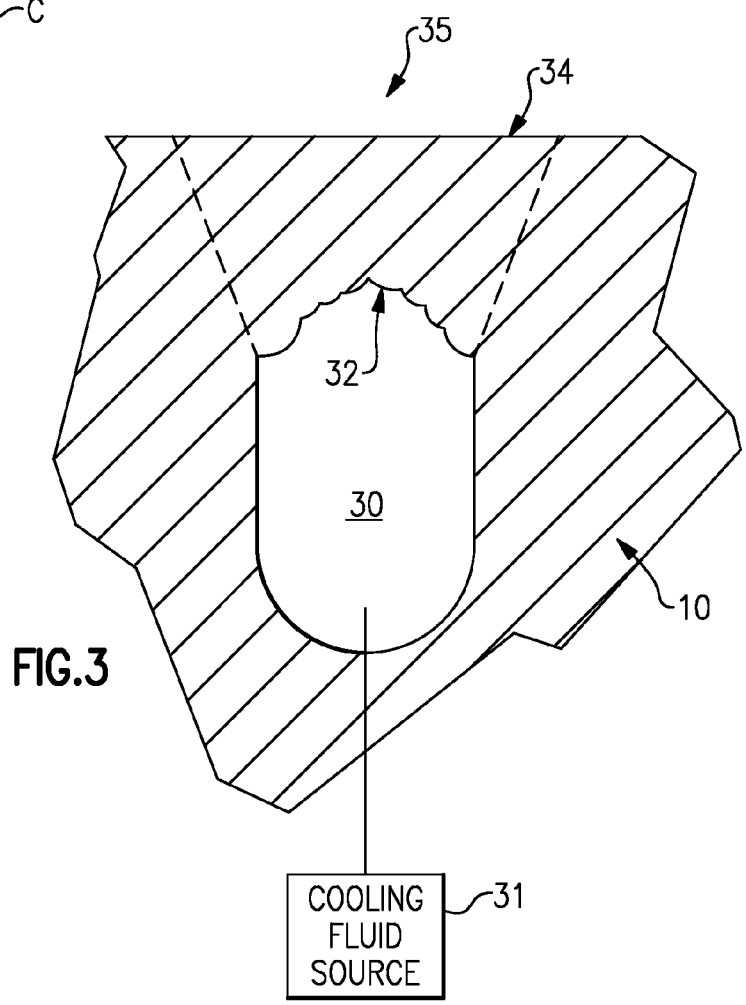
FIG. 3 is a cross-sectional view of an enclosed conformal cooling slot with an adjacent machined surface.

Referring to FIG. 3, the weld beads 28 provide a welded surface 32 of metal filler that, together with the cut conformal cooling slot 14, provides an enclosed conformal cooling passage 30. The finished conformal cooling passage 30 corresponds to a passage diameter of, for example, between ⅜ and ¾ inch. During use, the conformal cooling passages are fluidly connected to a cooling fluid source 31. Dashed lines indicate the previously present angled walls. The weld beads 28 and rough contoured surface 18 are machined to provide a class A machined surface 34 that corresponds to the finished moulded part shape.

Figure 4:
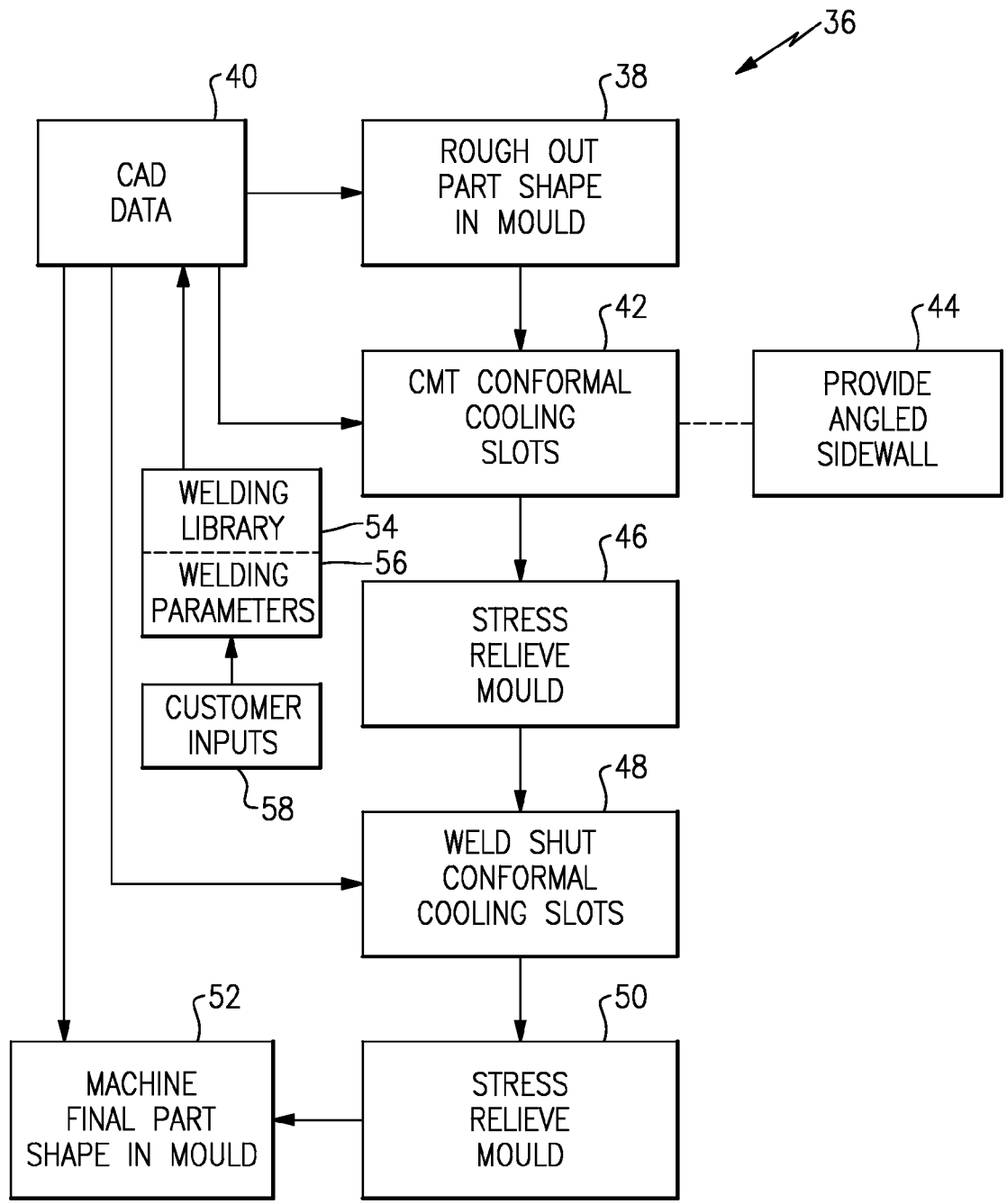
FIG. 4 is flowchart depicting a mould manufacturing method.

A mould manufacturing method 36 is schematically illustrated in FIG. 4. At least portions of the manufacturing method are provided by a controller (not shown), which may include hardware and/or software and temporary and/or permanent memory, for example, CAD data, robotic control algorithms and other information. CAD data 40 is used to rough out the part shape in the mould 10 to provide the rough mould cavity 12, as indicated at block 38. The cut conformal cooling slots 14 are machined, as indicated at block 42, in desired locations using the CAD data 40. Angled walls 22 are provided in cut conformal cooling slots 44 providing the welding torch adequate access, as indicated in block 44. The mould 10 is heated to provide stress relief, as indicated at block 46.

As indicated at block 48, weld beads 28 are robotically TIG welded onto the angled walls 22 using the CAD data 40 to create enclosed conformal cooling passages 30. The controller includes a welding library 54 in one example, which includes various welding parameters 56. The welding parameters may include, for example, travel speed of the welding torch, feed rate of the wire and welding current. The welding parameters are organized into sets of welding preferences associated with a conformal cooling passage size. For example, a ⅜ inch diameter cooling passage may include welding preferences of approximately 0.5 lb./hour wire feed rate a relatively low amperage and low welding torch speed. By way of contrast, a conformal cooling passage of approximately ¾ inch diameter may include welding preferences of 1.5 lb./hour wire feed rate and higher amperages and welding tip travel speed than that of a ⅜ inch conformal cooling passage. Thus, the welding step includes selecting from the predetermined set of welding preferences based upon the conformal cooling passage size. The available access for the welding torch may also affect the welding preferences.

The welding preferences are intended to accommodate all tool steels. The customer is permitted to provide a customer input 58 to vary some of the welding preferences by a predetermined amount. For example, customers may be permitted to vary the weld torch travel speed, wire feed rate and amperage by up to 10% to accommodate the customer's preferences and variations between different tool steels, for example.

The mould 10 is stress relieved after welding, as indicated at block 50. The weld beads 28 and rough contoured surface 18 are machined using CAD data 40 to provide a class A machined surface 34 corresponding to a finished part shape, as indicated in block 52.

Although an example embodiment has been disclosed, a worker of ordinary skill in this art would recognize that certain modifications would come within the scope of the claims. For example, although a vehicle bumper has been disclosed as an example moulded part, moulds for other large parts can benefit from the disclosed mould and method. For that reason, the following claims should be studied to determine their true scope and content.

What is claimed is:

1. A process for molding a part, comprising:
    providing a mold, comprising:
        at least one conformal cooling passage located subjacent to a molding surface to be cooled, said at least one conformal cooling passage formed from:
            a series of interconnected open channels placed in a molding surface of said mold, said channels substantially conforming to the contour of said molding surface,
            a bridging weld located within each channel, said bridging weld comprising a series of connected weld beads, said bridging weld spanning and sealing each channel and located in each channel at some distance from a bottom of each channel so as to form an enclosed cooling passage at the bottom thereof, and
            a plurality of weld beads that solidly fill a remaining volume of each channel above said bridging weld to close each channel, said weld beads located along an open top of each channel and shaped to conform to said molding surface of said mold surrounding that channel;
        an inlet associated with said at least one conformal cooling passage for receiving pressurized cooling fluid from a source thereof; and
        an outlet associated with said at least one conformal cooling passage for expelling cooling fluid to a heat removal device after said cooling fluid has passed through said at least one conformal cooling passage; and
    molding a part using the mold.

2. The process of claim 1, further comprising:
    establishing a flow of cooling fluid through the at least one conformal cooling passage during the molding step.

3. The process of claim 1, wherein said inlet and outlet of said at least one conformal cooling passage are accessible from an exterior of said mold.

4. The process of claim 1, wherein said mold is a plastic injection mold.

5. The process of claim 1, wherein the part is molded of plastic.

6. The process of claim 1, wherein the part includes a Class A surface that is visually free of distortions.

7. The process of claim 1, wherein the part is a vehicle bumper.

8. A process for molding a part using a mold, the mold comprising:
    a mold cavity generally corresponding to a molded part shape;
    a conformal cooling slot in the mold cavity:
    a conformal cooling slot welded shut using a computer-based cooling design to provide a conformal cooling passage, including a buildup of weld beads, on top of one another, inside the conformal cooling slot to weld shut the conformal cooling slot;
    the weld beads proud of an adjacent surface of the mold and solidly filling a remaining volume of the slot above a bridging weld to close each channel; and
    a machined surface over the conformal cooling passage corresponding to a mold part shape.

9. The process of claim 8, further comprising an inlet associated with said conformal cooling passage for receiving pressurized cooling fluid from a source thereof, and an outlet associated with said conformal cooling passage for expelling cooling fluid to a heat removal device after said cooling fluid has passed through said conformal cooling passage.

10. The process of claim 9, further comprising:
    establishing a flow of cooling fluid through the conformal cooling passage during the molding step.

11. The process of claim 9, wherein said inlet and outlet of said conformal cooling passage are accessible from an exterior of said mold.

12. The process of claim 8, wherein said mold is a plastic injection mold.

13. The process of claim 8, wherein the part is molded of plastic.

14. The process of claim 8, wherein the part includes a Class A surface that is visually free of unintentional distortions.

15. The process of claim 8, wherein the part is a vehicle bumper.

* * * * *